United States Patent [19]

Hsiang

[11] Patent Number: 5,528,085
[45] Date of Patent: Jun. 18, 1996

[54] ANTI-THEFT DEVICE FOR VEHICLE USING INTERRUPT RELAYS AND DIODES

[76] Inventor: Sheng-Hsiang Hsiang, No. 1-2, Lane 975, Chun-Jih Road, Tao-Yuan City, Taiwan

[21] Appl. No.: 231,682

[22] Filed: Apr. 25, 1994

[51] Int. Cl.[6] .................................................. B60R 25/04
[52] U.S. Cl. ................................. 307/10.200; 180/287
[58] Field of Search .................................. 307/10.1–10.6; 361/171, 172, 191; 180/287; 123/198 B, 198 DL, 198 DB; 340/426, 425.5, 825.3–825.32, 825.34, 825.44, 825.69, 825.72

[56] References Cited

U.S. PATENT DOCUMENTS

| | | | |
|---|---|---|---|
| 4,736,113 | 4/1988 | Leu | 340/825.32 |
| 5,061,915 | 10/1991 | Murphy | 340/426 |
| 5,218,338 | 6/1993 | Chang | 307/10.4 |
| 5,412,370 | 5/1995 | Berman et al. | 340/426 |

Primary Examiner—Jonathan Wysocki
Assistant Examiner—Richard T. Elms
Attorney, Agent, or Firm—Morton J. Rosenberg; David I. Klein

[57] ABSTRACT

An anti-theft device for a vehicle is provided. The anti-theft device includes a group of relays that are interconnected to the vehicle's circuit to be protected. The relays have their terminals B and C connected to the vehicle's circuit device and a pair of diodes or bridge diode. The cathode of one group of diodes are connected to a sensor, and the anode of another group of diodes are connected to the ground of said anti-theft device. By the one way conduction of the diodes, the battery voltage from the circuit being protected serves as an auxiliary power connection while not jeopardizing the normal function of the circuit being protected.

2 Claims, 4 Drawing Sheets

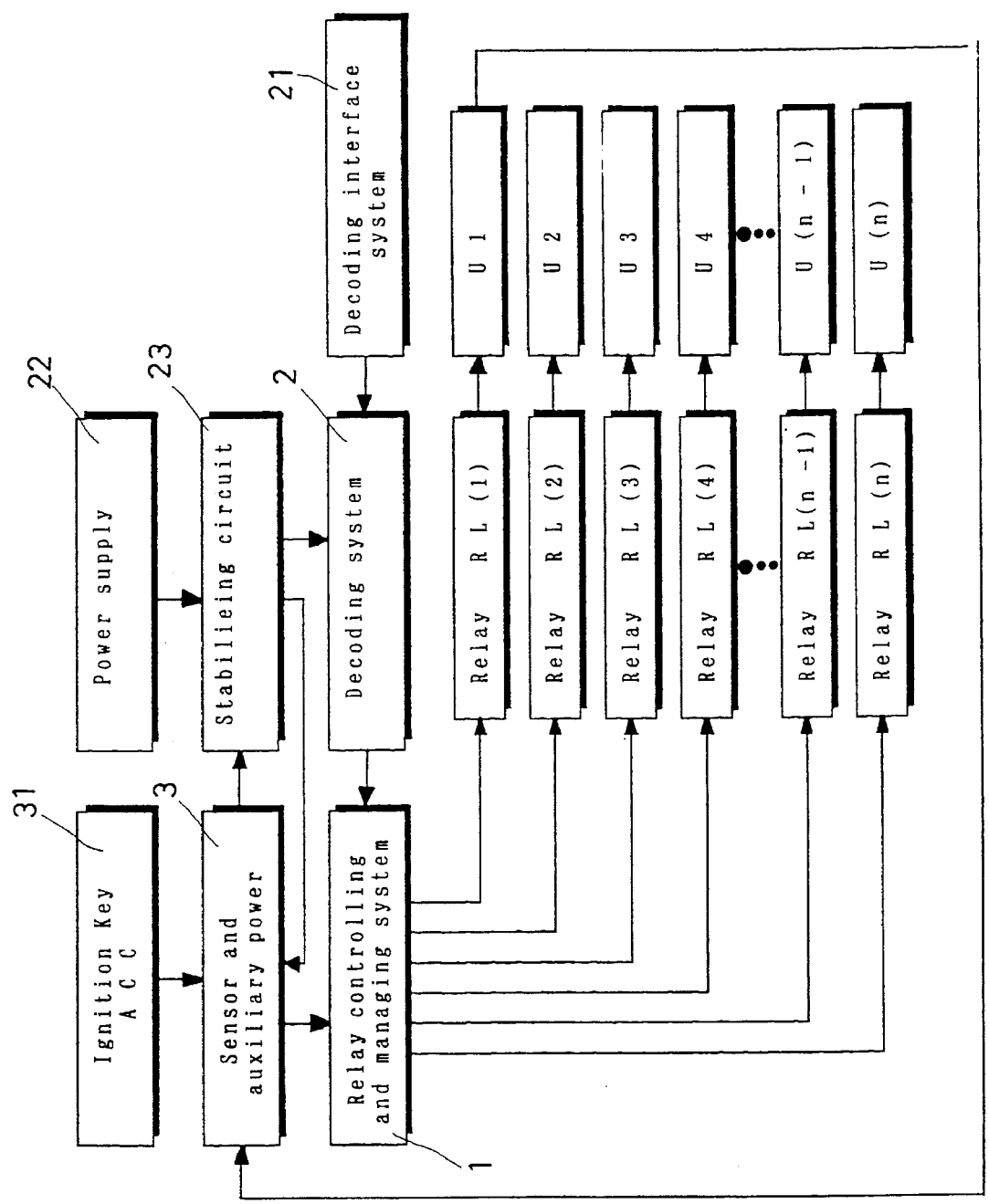
F I G. 2

ANTI-THEFT DEVICE FOR VEHICLE USING INTERRUPT RELAYS AND DIODES

BACKGROUND OF THE INVENTION

FIELD OF THE INVENTION

This invention relates to an anti-theft device. More in particular, this invention is directed to an anti-theft device for a vehicle which facilitates safe drivability and economic power consumption. The anti-theft device of this invention is specially designed to be difficult to override.

PRIOR ART

In the conventional anti-theft device, which is based on an electrical interruption, as shown in FIG. 1, the controlling circuit of the ignition coil U1, the starter motor U2, the fuel pump U3, the fuel injection and fuel delivery control system U4 are connected to the terminal A of the relays RL(1), RL(2), RL(3) and RL(4), respectively. When the anti-theft device is set in an armed condition, even when the power of the anti-theft device is interrupted, the engine of the vehicle is still unable to start, as the terminal A is the normally open contact of each relay. But, if the power wire of the anti-theft device is shorted or open during a normal driving, the swing arm of the relays will be returned to the terminal B position, accordingly, the power supplied to the electrical system components connected to terminal A will be interrupted completely. That condition is extremely dangerous.

In order to avoid the dangerous situation described above, one of the measures that can be taken is connecting the control circuit to the terminal B. Of course by this arrangement, the dangerous situation described above can be avoided, but the functions of the anti-theft are completely lost. With that arrangement, when the power supply of the anti-theft device is interrupted, power will still be supplied to all the vehicle circuits, as they are connected to the normally closed contacts of a respective relay.

On the other hand, when the conventional anti-theft device is set in an armed condition, a contact of the relay is enabled, accordingly, a great amount of battery power is consumed to operate the relay. If the car is left for a long period of time, the battery will be exhausted completely. It will bring an embarrassment and inconvenience to the driver, since the vehicle will have to be started by a jump connected battery.

SUMMARY OF THE INVENTION

It is the object of this invention to provide an anti-theft device for vehicle wherein the auxiliary power is interconnected to the interrupting circuit. A group of relays are interconnected to the control circuits, located inside the vehicle, that are pertinent to driving the vehicle. When the vehicle is in a normal driving condition or set in an armed condition, the normally closed contact of the relays are closed and the relay de-energized. Those circuits to be interrupted are powered by the vehicle's battery voltage through the normally closed contact of a respective relay. Accordingly, the vehicle is unable to be started when the anti-theft device is activated, while a safe driving condition is ensured.

It is still the object of this invention wherein the contact of the relay is open when the anti-theft device is set armed. By this arrangement, the power consumption is decreased to 3 mA, accordingly, the battery power is saved. When an intruder tampers with the vehicle, all the relay contacts of the vehicle anti-theft device then open to interrupt the circuits being protected. Hence, a great power is saved.

It is still the object of this invention to provide an anti-theft device wherein the relays incorporated are powered sequentially to decrease power consumption. The equipment whose circuits are interrupted, are not able to function. On the other hand, the voltage is supplied to the relays from alternate route, accordingly, a thief is unable to override the anti-theft device.

BRIEF DESCRIPTION OF THE DRAWINGS

The characteristics of the present invention and its advantages, as compared to the known state of the prior art, will be better understood from the following description, relating to the attached drawings which show illustratively but not restrictively an example of an improved vehicle anti-theft device.

In the drawings:

FIG. 2 is a block diagram of the controlling procedure of the present invention;

DESCRIPTION OF THE PREFERRED EMBODIMENT

Figure 1:
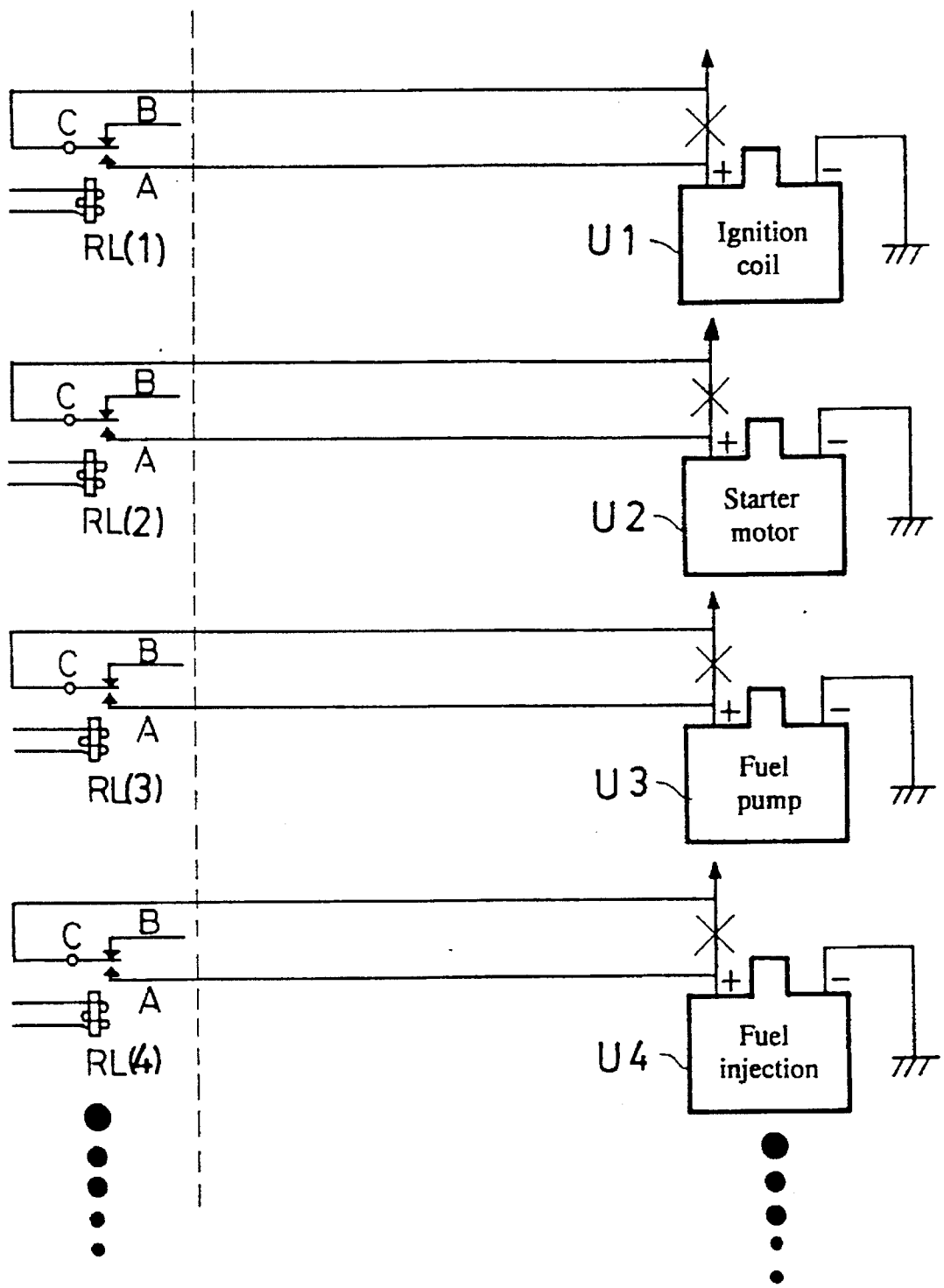
FIG. 1 is a circuit diagram for a conventional anti-theft device.
Figure 3:
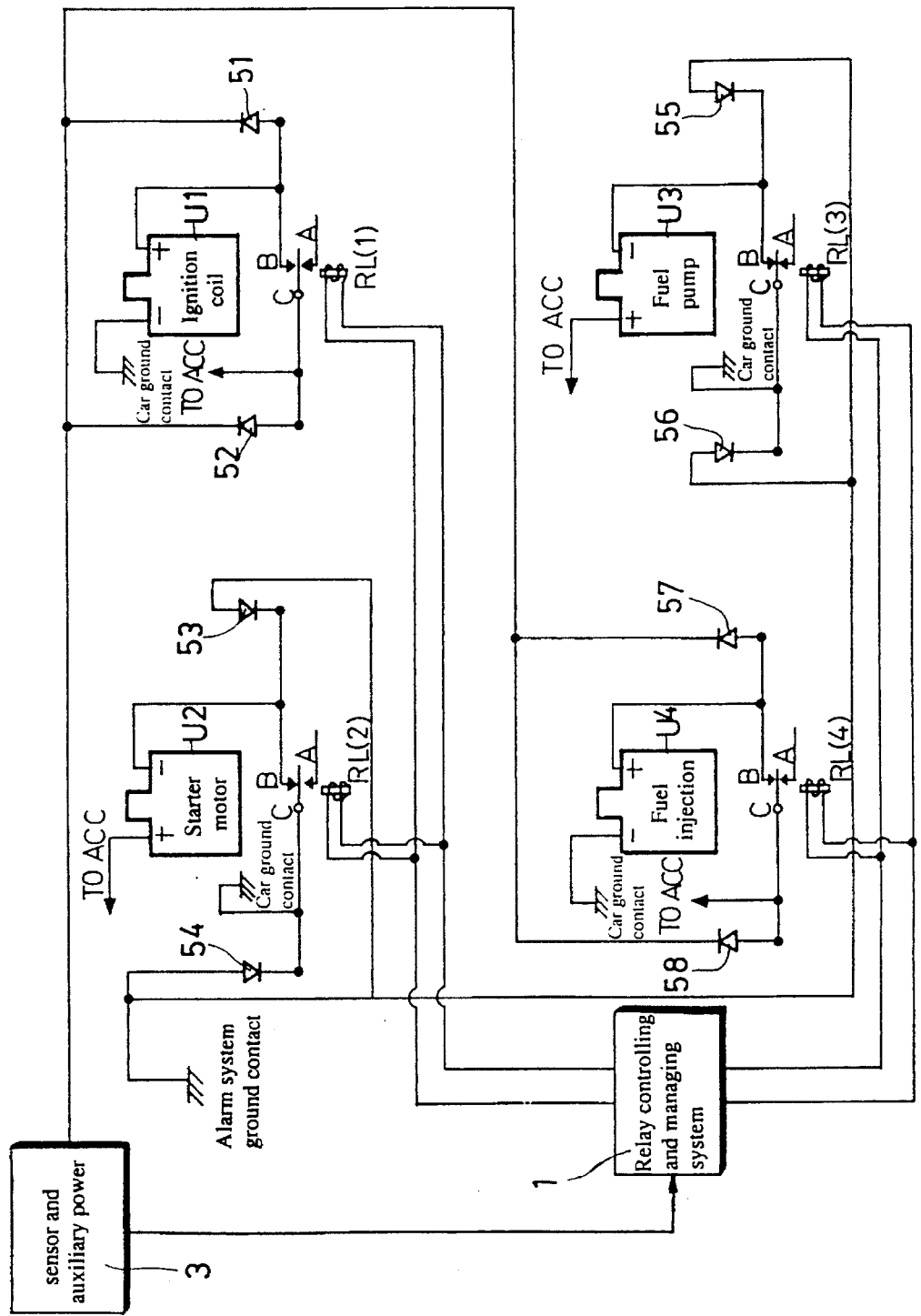
FIG. 3 is a circuit diagram of the anti-theft device made according to the present invention.

Referring to FIGS. 2 and 3, the anti-theft device made according to this invention includes at least a relay controlling and managing system 1 used to control a number of relays RL(1), RL(2), RL(3), RL(4), . . . , RL(N-1) AND RL(N).

A decoding system 2 is interconnected to the relay controlling and managing system 1. When a pass code is received from the decoding interface system 21, after recognition and confirmation, the controlling and managing system 1 is set active. The power supplied to the decoding system 2 is supplied by the vehicle's battery 22. This voltage supplied by battery 22 is supplied via a stabilizing circuit 23.

A sensor and auxiliary power supply 3 is interconnected to the ACC terminal 31 of the ignition key switch. When voltage from the power supply 22 to stabilizing circuit 23 is interrupted, the 12 volt DC power can be supplied from the ACC terminal 31, as a backup power source. The sensor 3 is used to detect the 12 V DC voltage at the ACC terminal of the ignition switch. When the ignition key is turned to the "OFF" position, the anti-theft alarm system will enter the armed condition within thirty (30) seconds while the relay controlling and managing system 1 will not be triggered. Meanwhile, if no correct passcode enters the decoding system 2 and the ignition key is turned "ON", or the ignition coil is tampered with to start the vehicle, all of the relays RL(1), RL(2), etc. will function to switch the respective circuits being protected, to interrupt power thereto. The anti-theft device will have thereby entered the activated condition. Accordingly, the vehicle will be unable to start.

By means of those elements, the anti-theft device can provide a completely anti-theft effect while it provides for a safe driving situation.

A detailed description of the circuitry of FIG. 3 is given below.

A number of relays RL(1), RL(2), RL(3), RL(4) . . . are connected to the controlling circuits that are pertinent to driving the vehicle, such as the ignition coil U1, the starter motor U2, the fuel pump U3, the fuel injecting and delivering system U4, etc. On the other hand, the relays RL(1), RL(2), RL(3), and RL(4) each have respectively connected to the terminals B and C a pair of diodes 51 and 52, 53 and 54, 55 and 56, 57 and 58. The cathodes of the diodes 51, 52, 57 and 58 are connected to the sensor 3 in parallel, and the anode of diodes 53, 54, 55 and 56 are connected to the ground (GND) of the anti-theft device.

The output wires of the relay RL(1)-RL(4) are identical with each other in color and gauge. Accordingly, their exact function cannot be easily determined. If the anti-theft device is installed inside the vehicle, it is preferable to install a relay or two relays with contacts connected to ground. For example, the relay RL(1) is connected to the positive of the vehicle, and the relay RL(2) is connected to the negative of the vehicle. On the other hand, the relay RL(3) is connected to the negative, and the relay RL(4) is connected to the positive. As a result, when the anti-theft device is tampered with, or when an intruder attempts to start the vehicle, the ignition key switch 31 being turned "ON" or the ignition circuit being shorted, the 12V DC at the ACC terminal or at the respective vehicle circuit is detected. The voltage supplied to the vehicle circuit is then supplied to the relays RL(1) to RL(4). The diodes 51, 52 and 57, 58 connected in parallel, will provide this voltage to the sensor 3 and provide an auxiliary connection to the power source. By utilizing the feedback voltage from the ACC terminal, the decoding system confirms a tampering condition. Accordingly, the relays RL(1) to RL(4) are operated and the power supply to the protected vehicle circuits are thereby interrupted.

When the anti-theft device is in an activated condition, the relays RL(1) to RL(4) are operated alternatively and not simultaneously, as in conventional anti-theft devices. That is, when the normally open contacts of relays RL(1) and RL(2) are closed, the normally closed contacts of relays RL(3) and RL(4) are open, and while the normally closed contacts of relays RL(3) and RL(4) are closed, the normally closed contacts of relays RL(1) and RL(2) are open. This alternating sequence will continue to run until the correct passcode is input. When the correct passcode is input, the relays RL(1) to RL(4) resume a de-energized state, and all the vehicle circuits to be protected are connected to the respective vehicle control circuits. In normal driving or when the anti-theft device is set in an armed condition, the relays RL(1) to RL(4) are set in a de-energized condition, where the relays RL(1) to RL(4) are set in a de-energized condition, where all of the circuits to be protected are connected to their respective vehicle circuit wiring.

Figure 4:
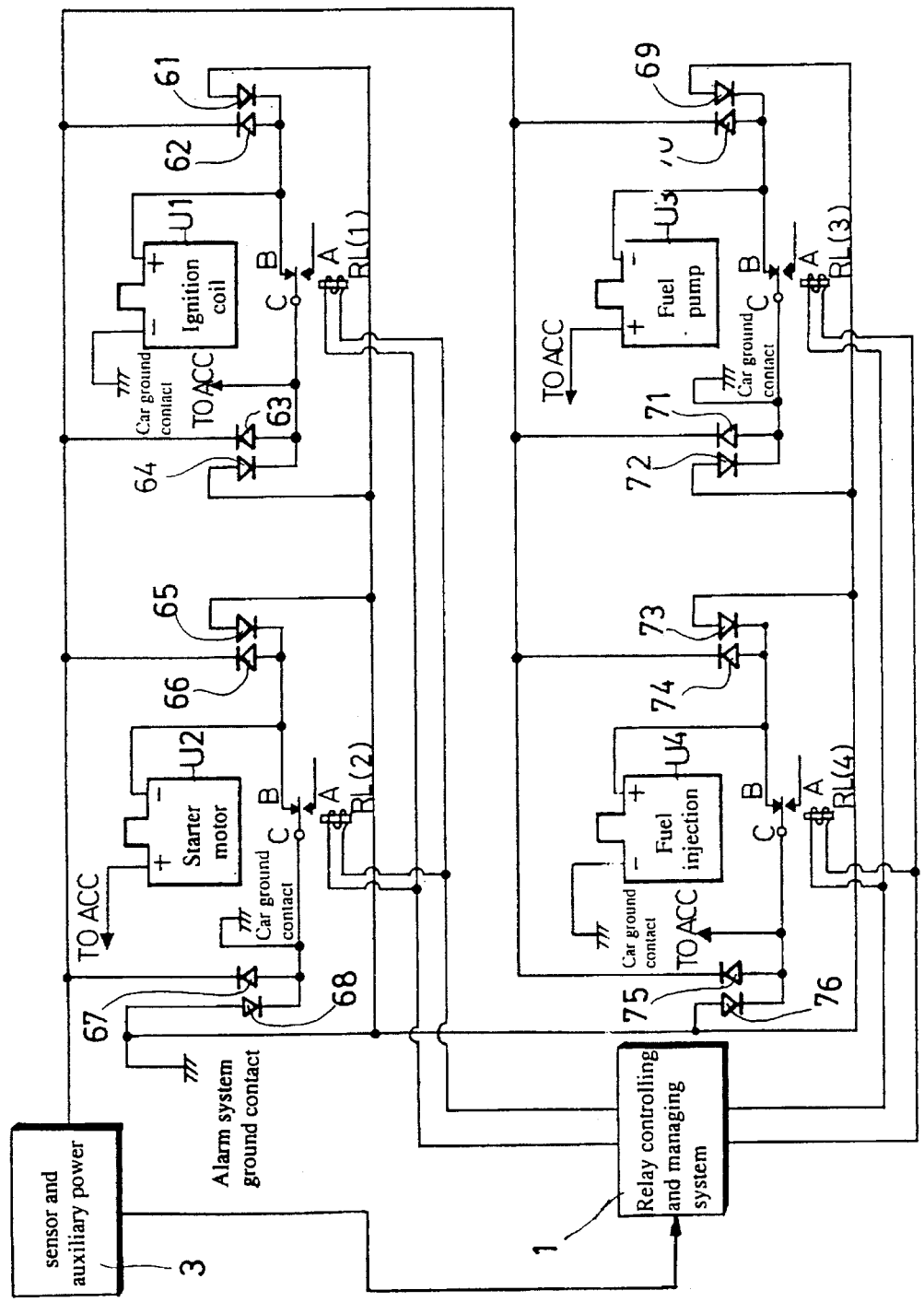
FIG. 4 is a circuit diagram of an alternate configuration of the anti-theft device according to the present invention.

As shown in FIG. 4, each diode can be replaced with bridge diodes 61, 62, 63, 64; 65, 66, 67, 68; 69, 70, 71, 72; and 73, 74, 75, 76, respectively. The advantages of this bridge diode is that it is easy to install. The bridge diodes do not need to be connected directly to the circuit to be protected, such as the U1, U2, U3 and U4. Each diode bridge circuit can serve as a detecting point.

It can be concluded that the above described anti-theft device has the following advantages:

1. Under normal conditions, the relays are in a de-energized condition and all the vehicle circuits to be protected are supplied with battery voltage. Accordingly, the potential danger resulting from an accidentally shorted or open relay is completely avoided.
2. The anti-theft device made according to this invention uses a diode to provide one-way conduction. The power from the circuits, U1 to U4, to be protected serve as a backup power connection. When the ignition key is turned "ON", the anti-theft device is set in an armed condition immediately. It therefore is still possible to provide a sound anti-theft function when the power connection from the vehicle's battery to the anti-theft device is interrupted. But, for the conventional anti-theft device, when the power connection is interrupted, the anti-theft function is completely lost.
3. No electric spark occurs in the contacts of the relays, accordingly, their service life is very long. On the other hand, when the anti-theft device is set in an armed condition, the relays remain de-energized to save the battery power. Only when the vehicle is tampered with are the relays energized and de-energized alternatively. Accordingly, the power consumption of this anti-theft device is economical and better than that of the conventional one.
4. Even when the primary power supply connection to the anti-theft device is cut off, the relays are still functional, the contacts of the relays being closed and opened alternatively. Additionally, the output wires of the relays are identical in gauge and color, to make it difficult and inconvenient to attempt to bypass.
5. The relays RL(1), RL(2), RL(3) and RL(4) are energized and de-energized alternatively. When a relay is de-energized, the equipment to be protected is properly connected to the vehicle wiring. Even if an external 12 V DC is applied, the protected equipment will still be inoperative. By this arrangement, perfect protection can be ensured.

Although the present invention has been described in connection with the preferred embodiment, many other variations and modifications will now become apparent to those skilled in the art without departing from the scope of the invention. It is preferred, therefore, that the present invention not be limited by the specific disclosure herein, but only by the appended claims.

I claim:

1. An anti-theft device for a vehicle, comprising:

a voltage sensing circuit having a first input coupled to an accessory terminal of a vehicle's ignition key switch, a stabilizing circuit having a pair of inputs respectively coupled to said voltage sensing circuit and a vehicle's battery;

decoder means coupled to said stabilizing circuit for decoding and validating a pass code;

a decoder interface having an output coupled to said decoder means for transmitting a pass code entered by a user to said decoder means;

a plurality of relays coupled to selected vehicle circuit components, each of said plurality of relays having a pair of normally closed contacts coupled in series relation with a vehicle circuit component for supplying power thereto when said relay is de-energized, at least one of said plurality of relays having one said pair of normally closed contacts coupled to a positive terminal of a selected vehicle circuit component and at least another of said plurality of relays having one said pair of normally closed contacts coupled to a negative terminal of a selected vehicle circuit component;

control means having (1) a plurality of outputs respectively coupled to said plurality of relays, (2) one input coupled to an output of said decoder means, and (3) another input coupled to an output of said voltage sensing circuit for energizing said plurality of relays and thereby opening said pairs of normally closed contacts responsive to detection of a tampering condition; and, a plurality of pairs of diodes respectively coupled to said plurality of relays, each diode of each of said pairs of diodes having one terminal coupled to a respective one of said pair of normally closed contacts and where said pair of normally closed contacts are coupled in series with a positive terminal of a selected vehicle circuit component then an opposing terminal of each of said pair of diodes coupled to a second input of said voltage sensing circuit for coupling a positive voltage thereto to be sensed and provide an alternate power connection thereto, said opposing terminal of each of said diodes coupled to a ground connection of said anti-theft device where said pair of normally closed contacts are coupled in series with a negative terminal of a selected vehicle circuit component to provide an alternate ground connection.

2. The anti-theft device as recited in claim 1 where said control means includes means for sequentially and alternately energizing one portion of said plurality of relays with respect to another portion of said plurality of relays responsive to said detection of a tampering condition.

* * * * *